(12) United States Patent
Ohashi et al.

(10) Patent No.: US 8,618,489 B2
(45) Date of Patent: Dec. 31, 2013

(54) SCINTILLATOR CRYSTAL HAVING PHASE-SEPARATED STRUCTURE

(75) Inventors: Yoshihiro Ohashi, Tokyo (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/422,516

(22) Filed: Mar. 16, 2012

(65) Prior Publication Data

US 2012/0248317 A1 Oct. 4, 2012

(30) Foreign Application Priority Data

Mar. 30, 2011 (JP) ................................. 2011-074978

(51) Int. Cl.
*G01T 1/10* (2006.01)
(52) U.S. Cl.
USPC ....................................................... 250/361 R

(58) Field of Classification Search
USPC ....................................................... 250/361 R
See application file for complete search history.

(56) References Cited

U.S. PATENT DOCUMENTS 5,445,846 A * 8/1995 Yoshida ........................... 427/65

FOREIGN PATENT DOCUMENTS

JP 2008-145335 A 6/2008

* cited by examiner

*Primary Examiner* — Kiho Kim
(74) *Attorney, Agent, or Firm* — Fitzpatrick, Cella, Harper & Scinto

(57) ABSTRACT

A scintillator crystal to be used for a radiation detector such as X-ray CT apparatus has a unidirectional phase-separated structure and provides a light guiding function without forming partitions to prevent any crosstalk. The scintillator crystal comprises a phase-separated structure including a plurality of first crystal phases of the columnar crystals with unidirectionality and a second crystal phase covering lateral surfaces of the first crystal phases. At least the second crystal phase comprises CuI and emits light when excited by radiation.

9 Claims, 4 Drawing Sheets

SCINTILLATOR CRYSTAL HAVING PHASE-SEPARATED STRUCTURE

BACKGROUND OF THE INVENTION

1. Field of the Invention

The present invention relates to a scintillator, a material that emits light when excited by radiation. More particularly, the present invention relates to a scintillator crystal functionally capable of guiding light emitted from the scintillator to photodetectors. The present invention also relates to a radiation detector using a scintillator crystal.

2. Description of the Related Art

In a X-ray CT (computed tomography) apparatus to be employed in a clinical site, X-rays transmitted through a subject are received by scintillators and lights emitted from the scintillators are detected by photodetectors. The photodetectors are arranged in two-dimensional array and the scintillators are separated by partitions so as not to give rise to any crosstalk of light. The partitions are desirably formed as thin as possible from the viewpoint of not contributing the partitions to a detection of X-rays and preventing the spatial resolution of the X-ray CT apparatus from degrading.

For example, Japanese Patent Application Laid-Open No. 2008-145335 discloses a technique of forming a scintillator array by bonding together a large number of scintillator crystals by means of adhesive, subsequently etching the adhesive and filling the voids produced as a result of the etching with titanium oxide powder as partition material. According to the cited patent literature, the partitions as thin as about 1 μm can be formed.

However, while the technique disclosed in Japanese Patent Application Laid-Open No. 2008-145335 can produce thin partitions, it cannot eliminate the presence of partitions. Also, from the viewpoint of manufacturing steps, the disclosed technique requires a large number of steps including a step of cutting a scintillator and a step of bonding scintillators to form the partitions.

Further features of the present invention will become apparent from the following description of exemplary embodiments with reference to the attached drawings.

SUMMARY OF THE INVENTION

The object of the present invention is to provide a scintillator with a light guiding function in order to radically improve the situation that the conventional scintillators require the partitions operating as scattering surface and reflecting surface due to no functions guiding the light in the conventional scintillators.

In an aspect of the present invention, there is provided a scintillator crystal, comprising: a plurality of first crystal phases with unidirectionality; and a second crystal phase covering lateral surfaces of the first crystal phases, wherein the second crystal phase comprises CuI.

Preferably, the first crystal phases comprise columnar crystals.

Preferably, the second crystal phase has a refractive index greater than a refractive index of the first crystal phases.

Preferably, the first crystal phases comprise NaCl, NaBr, KCl or KBr.

Preferably, when a composition ratio of the first crystal phases is $X$ (mol %) and a composition ratio of the second crystal phase is $Y$ (mol %) in eutectic composition of the first crystal phases and the second crystal phase, a composition ratio $X'$ (mol %) of the first crystal phases and a composition ratio $Y'$ (mol %) of the second crystal phase in the scintillator crystal satisfy the requirements of $(X-5) \leq X' \leq (X+5)$ and $X'+Y'=100$.

Preferably, an average of nearest-neighbor distances of the first crystal phases is not less than 500 nm and not more than 50 μm.

Preferably, the second crystal phase emits light when the second crystal phase is excited by radiation.

In another aspect of the present invention, there is provided a radiation detector comprising a photodetector and a scintillator crystal arranged to face the photodetectors, wherein the scintillator crystal is one as described above and is arranged in such a way that the first crystal phase is perpendicularly directed to the photodetector.

Preferably, a protective layer is arranged between the photodetector and the scintillator crystal.

According to the present invention, a scintillator crystal including a phase-separated structure having two different phases of a plurality of first crystal phases with unidirectionality and a second crystal phase covering the lateral surfaces of the first crystal phases, and having a function of guiding light by itself can be obtained. As a result, according to the present invention, a process of cutting a scintillator and a process of forming partitions to manufacture the conventional scintillators are not required. Further, a radiation detector can be obtained by arranging a scintillator crystal to face photodetectors arranged in array.

Further features of the present invention will become apparent from the following description of exemplary embodiments with reference to the attached drawings.

DESCRIPTION OF THE EMBODIMENTS

Now, embodiments of the present invention will be described below by referring to the accompanying drawings.

Note that, while the present invention can be embodied in various different ways (in terms of configuration and material), all embodiments commonly include of scintillator crystal including a phase-separated structure having a plurality of first crystal phases with unidirectionality and a second crystal phase covering the lateral surfaces of the first crystal phases, the second crystal phase includes CuI. With such an arrangement, when the first crystal phases are low refractive index phases and the second crystal phase is a high refractive index phase, light propagated through the second crystal phase that is a high refractive index phase is totally reflected by the first crystal phases that are low refractive index phases whose lateral surfaces are covered with the second crystal phase. As a result, the light is so guided as to travel in the crystal phase having high refractive index. Since the second crystal phase that is a high refractive index phase covers the lateral surfaces of the plurality of first crystal phases with unidirectionality, the light guiding can be performed so as to direct to one way. The light guiding can be also performed so as to direct to one way even if the first crystal phases are high refractive index phases and the second crystal phase is a low refractive index phase. In short, the light generated in the scintillator crystal travels in a single direction while being confined within the first crystal phase or the second crystal phase (without spreading). Thus, in all the embodiments of the present invention, the scintillator crystal itself has a light guiding function.

Note that, in each of the embodiments that will be described hereinafter, the first crystal phases preferably cover the lateral surface of the second crystal phase. With this arrangement, the light propagating within the crystal phase can be guided more reliably in a single direction without spreading along a plane perpendicular to the single direction.

Further, it is preferable that the first crystal phases are low refractive index phases whose lateral surfaces are covered with the second crystal phase that is a high refractive index phase. With this arrangement, a scintillator crystal according to the present invention can sufficiently achieve the light guiding function while being suppressed the occupancy ratio of the first crystal phases in the scintillator crystal.

Now, the present invention will be described in detail below.

[Configuration of Scintillator Crystal]

Figure 1:
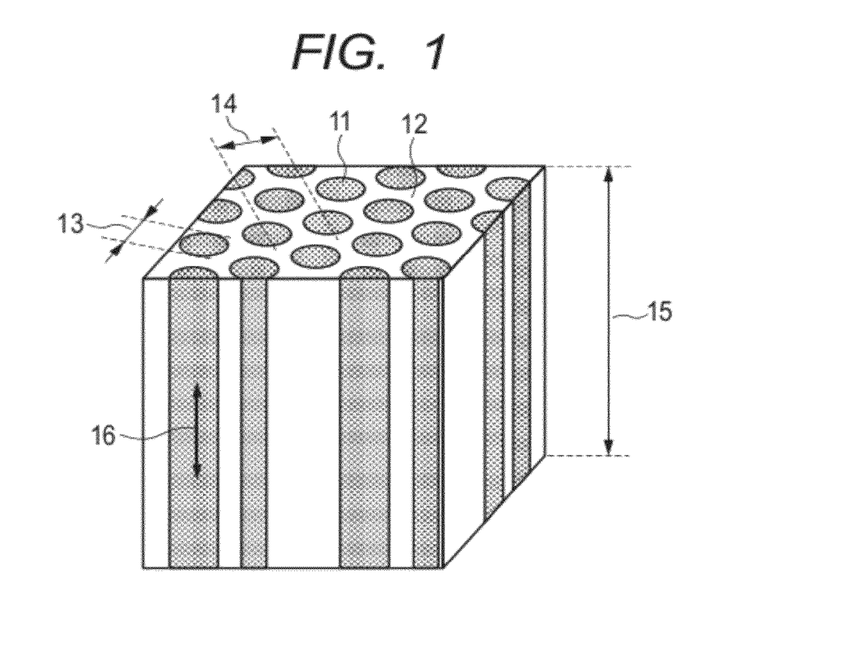
FIG. 1 is a schematic illustration of a scintillator crystal according to the present invention.

FIG. 1 is a schematic illustration of a scintillator crystal according to the present invention.

A scintillator crystal according to the present invention includes a phase-separated structure having a large number of first crystal phases 11 of the columnar crystals with unidirectionality and a second crystal phase covering the lateral surfaces of the first crystal phases 11. The shape of the columnar crystals constituting the first crystal phases 11 is not limited to cylindrical and may include a plurality of shapes such as polygon. The diameter 13 of the first crystal phase is preferably not less than 50 nm and not more than 30 µm. The average of the nearest-neighbor distances 14 of the first crystal phases is preferably not less than 500 nm and not more than 50 µm. The light generated in the scintillator crystal reaches to photodetectors while being reflected by the interfaces of the first crystal phases and the second crystal phase. If the structural period of the first crystal phases is smaller than the wavelength of the light, the component of light that is transmitted without being reflected increases. Therefore, the lower limit value of the nearest-neighbor distance 14 of the first crystal phases is desirably greater than the wavelength of generated light. The nearest-neighbor distance 14 of the first crystal phases is desirably not less than 500 nm because photodetectors which are sensitive for light having a wavelength of not less than 500 nm are employed for the purpose of the present invention. On the other hand, the upper limit value for the nearest-neighbor distance 14 of the first crystal phases is desirably smaller than the size of one pixel of a photodetector because the effect of confining light in one pixel is reduced when the nearest-neighbor distance 14 of the first crystal phases exceeds the size of one pixel. Since photodetectors in which each pixel has a 50 µm square pixel size are employed for the purpose of the present invention, the nearest-neighbor distance 14 of the first crystal phases is desirably not greater than 50 µm. On the other hand, the diameter 13 of the first crystal phase is determined depending on the nearest-neighbor distance 14 of the first crystal phases. The light confinement effect is boosted as the diameter 13 of the first crystal phase becomes large relative to the nearest-neighbor distance 14 of the first crystal phases. The diameter 13 of the first crystal phase is preferably about 60% of the nearest-neighbor distance 14 so as to arrange first crystal phases in close packing. When the upper limit value for the nearest-neighbor distance 14 of the first crystal phases is 50 µm, the diameter 13 of the first crystal phases is desirably 30 µm. When, on the other hand, the lower limit value for the nearest-neighbor distance 14 of the first crystal phases is 500 nm and the diameter 13 of the first crystal phases is too large, the structural period of crystal phase interfaces that operate as light reflecting surfaces becomes smaller than the wavelength of light so that the component of light that is transmitted without being reflected increases. Therefore, when the nearest-neighbor distance 14 of the first crystal phases is 500 nm and hence equal to the lower limit value, the diameter 13 of the first crystal phases is desirably 50 nm. In short, the diameter 13 of the first crystal phases is preferably within a range of not less than 50 nm and not more than 30 µm and the average of the nearest-neighbor distances 14 of the first crystal phases is preferably within a range of not less than 500 nm and not more than 50 µm. When, however, a scintillator crystal according to the present invention is combined with detectors or a detector array, the scintillator crystal that is combined with such photodetectors is preferably such that the scintillator crystal has a structural size so as to arrange a large number of columnar crystals to face light receiving regions of the photodetectors. A nearest-neighbor distance of the first crystal phases as used herein refers to the distance of the line connecting the centers of two neighboring first crystal phases. When the light receiving region of a photodetector is a 20 µm square, a scintillator crystal whose structural size is such that the diameter of the first crystal phases is 5 µm and the average of the nearest-neighbor distances of the first crystal phases is 8 µm is preferably combined with such photodetectors. Thus, photodetectors are preferably combined with a scintillator crystal having a structural size smaller than the light receiving region of the photodetectors, in accordance with the size of the light receiving region. The structural size of a scintillator crystal according to the present invention is determined by the selection of materials constituting the scintillator crystal and the conditions of manufacturing the scintillator crystal, which will be described hereinafter.

The thickness 15 of the scintillator crystal can be adjusted to any desired value although the thickness may depend on the manufacturing method. The first crystal phases are preferably linearly continuous in the direction 16 of the thickness of the first crystal phases, although the present invention does not eliminate instances where some of the first crystal phases are discontinued and/or branched somewhere between the opposite ends thereof, instances where a plurality of crystal phases are combined, instances where the diameters of some of the crystal phases vary and/or instances where some of the first crystal phases are not linear but have one or more nonlinear parts. The columnar crystals of the first crystal phases can be intentionally bent by appropriately controlling the direction of the solidification interface, which will be described hereinafter.

The first crystal phase is formed preferably by using a material selected from NaCl, NaBr, KCl and KBr, more preferably by using KCl. The second crystal phase preferably includes CuI. For the selecting the materials thereof, the material composition of the first crystal phase and the second crystal phase is important. Table 1 represents preferable composition ratios (mol %) of four different combinations of materials that can be used for a scintillator crystal according to the present invention.

TABLE 1

| First crystal phase:Second crystal phase | composition ratio [mol %] |
|---|---|
| NaCl:CuI | 10:90 |
| NaBr:CuI | 8:92 |
| KCl:CuI | 30:70 |
| KBr:CuI | 25:75 |

To obtain a scintillator crystal having an excellent phase-separated structure as schematically illustrated in FIG. 1, the scintillator crystal is basically preferably manufactured by using any of the compositions listed in Table 1. The listed composition ratios correspond to respective eutectic compositions. Note that, the above composition ratios need not to be the eutectic composition. Preferably, it is permissible that a composition ratio is within a range of the eutectic composition±5 mol %. In other words, the composition ratio X' (mol %) of the first crystal phases and the composition ratio Y' (mol %) of the second crystal phase respectively satisfy the following formulas. If the composition ratio of the first crystal phases is X (mol %) and that of the second crystal phase is Y (mol %) in the eutectic composition of the first crystal phases and the second crystal phase, $(X-5) \leq X' \leq (X+5)$ and $X'+Y'=100$.

The reason for defining the above allowable range of the composition is that the above materials represent an eutectic relation when forming a phase-separated structure of a scintillator crystal and a crystal having a high quality phase-separated structure as illustrated in FIG. 1 can be obtained by unidirectionally solidifying the above materials with a composition ratio that is same as or close to the eutectic composition. Outside the allowable range, or when the composition ratio is out of the range of the eutectic composition±5 mol %, one of the crystal phases is earlier precipitated to produce a cause of disturbing a good phase-separated structure of a scintillator crystal from the viewpoint of forming a phase-separated structure.

One or more materials other than the above-described materials may be added respectively to the first crystal phases and the second crystal phase. When one or more materials other than that are added to the material constituting the first crystal phases 11, preferably the material is such that a solid solution can be produced for the first crystal phases 11 but no solid solution can be produced for the second crystal phase 12 with the composition obtained after adding the material. Such a material may be NaBr when added to NaCl that is the material of the first crystal phases.

CuI is excited by irradiation with radiation to emit light when CuI is employed as the material of the second crystal phase 12 as in the case of the present invention. While the second crystal phase 12 that is formed by CuI and has a refractive index higher than that of the first crystal phases 11 preferably emits light for the purpose of the present invention, both the first crystal phases and the second crystal phase may emit light.

Guiding the light is one of the important characteristics of a scintillator crystal of a phase-separated structure having first crystal phases that extend in one direction according to the present invention. Table 2 represents the refractive index and the refractive index ratio (the refractive index of the first crystal phase/the refractive index of the second crystal phase) of the material systems for forming the first crystal phases 11 and the second crystal phase 12.

TABLE 2

| material system | refractive index of first crystal phase | refractive index of second crystal phase | refractive index ratio (refractive index of first crystal phase/refractive index of second crystal phase |
|---|---|---|---|
| NaCl—CuI | 1.55 | 2.35 | 0.660 |
| NaBr—CuI | 1.64 | 2.35 | 0.698 |
| KCl—CuI | 1.49 | 2.35 | 0.634 |
| KBr—CuI | 1.54 | 2.35 | 0.655 |

Each of the refractive indexes listed in Table 2 can be changed by the wavelength dependency thereof or materials adding to the material constituting the first or second phase. Thus, the refractive indexes listed in Table are not rigorous. In other words, Table 2 only represents that the materials constituting the crystal phases represent a difference of refractive index (refractive index ratio).

According to Snell's law, for materials having different refractive indexes, total reflection takes place when light enters the lower refractive index medium from the higher refractive index medium at a certain incident angle whereas both reflection and refraction take place when light enters the lower refractive index medium from the higher refractive index medium at an incident angle smaller than the certain incident angle. Thus, due to the total reflection, light is not spread in a scintillator crystal having a phase-separated structure and representing any of the refractive index ratios listed in Table 2 if light enters the lower refractive index medium from the higher refractive index medium of the scintillator crystal of the present invention. In other words, the light that propagates through the higher refractive index medium is repeatedly refracted and reflected so that the light propagates through the inside of the higher refractive index medium while being confined in comparison with the lower refractive index medium. Thus, the refractive index ratio (=the refractive index of the crystal phases having a lower refractive index/the refractive index of the crystal phase having a higher refractive index) is desirably smaller than 1. Additionally, from the viewpoint of the condition of only total reflection, light is spread more difficulty as the refractive index ratio is small. From Table 2, when CuI is employed as higher refractive index medium, the lower refractive index medium allows light to spread more difficulty in the order of NaBr, NaCl, KBr and KCl. Note that the second crystal phase 12 is made of CuI that is a higher refractive index medium for the purpose of the present invention. The second crystal phase forms a matrix that surrounds the first crystal phases that are the columnar crystals. Therefore, if the composition ratio of the first crystal phases 11 that are the columnar crystals of the material systems is low in each scintillator crystal (e.g., NaCl: 10 mol % relative to KCl: 30 mol %), the volume ratio of the columnar crystals in the scintillator crystal is low. As a result, the light tends to propagate more easily in the second crystal phase that is the matrix covering the lateral surfaces of the columnar crystals. In the material systems listed above for the purpose of the present invention, the volume ratio of the first crystal phase in each scintillator crystal rises in the order of NaBr, NaCl, KBr and KCl. Therefore, from the viewpoint of guiding light in a scintillator, both the refractive index ratio and the volume ratio need to be taken into consideration. The first crystal phases 11 are most preferably formed by KCl in the four material systems. Note that the material of the first crystal phases needs to be selected by also considering the luminous efficiency of the scintillator crystal that emits light when excited by radiation in accordance with the intended use. In other words, all the material systems listed above are important because the relative merits of scintillator are not determined only refractive index ratio and volume ratio.

A scintillator crystal according to the present invention is characterized in that the second crystal phase is made of CuI that is a high refractive index material. As a result, the refractive index ratio between the refractive index of the first crystal phases having a refractive index lower than the refractive index of the second crystal phase and the refractive index of the second crystal phase can be raised. Then, light emitted from the CuI that is excited by irradiating radiation to the scintillator crystal from right above efficiently propagates within the second crystal phase. Then, as a result, if compared with a scintillator crystal formed by a combination of materials representing a refractive index ratio of greater than 0.7, the quantity of emitted light that reaches right below increases. Furthermore, since the spreading of light is suppressed as pointed out above, the spatial resolution of the scintillator crystal can be improved.

Thus, a scintillator crystal having a phase-separated structure according to the present invention is characterized by having characteristics of guiding light parallel along the plurality of first crystal phases that are columnar crystals representing unidirectionality but not guiding light, such as scattering and reflection, along directions that are perpendicular to the above light guiding direction. Therefore, a scintillator crystal according to the present invention can suppress any crosstalk of light without providing the scintillator crystal with partitions unlike conventional scintillators formed by a group of single crystals.

Manufacturing Scintillator Crystal

Any method of unidirectionally melting and solidifying a desired material system having an optimum composition may be used for manufacturing a scintillator crystal according to the present invention. Particularly, as described below, the temperature gradient of the introduced sample lot of the materials is required to be so controlled as to make the solid/liquid interface of the sample smooth along a plane perpendicular to the moving direction of the heater and/or the sample and the temperature gradient is preferably about or higher than 30° C./mm. Note than, the temperature gradient my be reduced within a range that does not provide any obstacle to the formation of the phase-separated structure of the scintillator crystal of each embodiment of the present invention in order to prevent any risk of generation of defects such as cracks due to thermal stress to the crystal in the crystal phases. The scintillator crystal may desirably be reheated to such an extent that the part thereof that has turned to the scintillator crystal may not be melted in order to suppress or eliminate the defects such as cracks. The range of composition in which the eutectic composition of the phase-separated structure of a scintillator crystal according to the present invention can be achieved is the eutectic composition±5 mol % as described above. A scintillator crystal according to the present invention should be manufactured so as to be found within a category referred to as coupled eutectic zone where a correlation specific to the material system holds true among the above composition range, the temperature gradient and the solidification rate which will be described hereinafter.

Figure 2A:
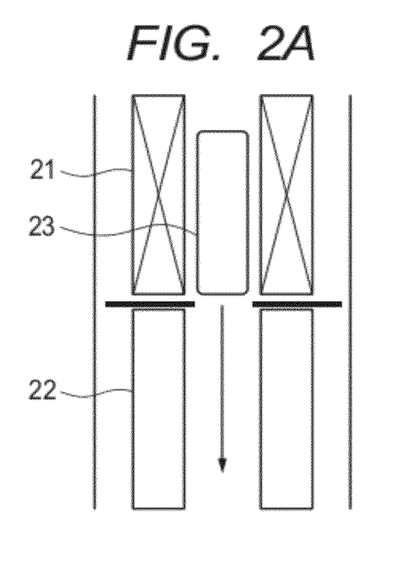
FIG. 2A is a schematic view of an apparatus for manufacturing a scintillator crystal according to the present invention.
Figure 2B:
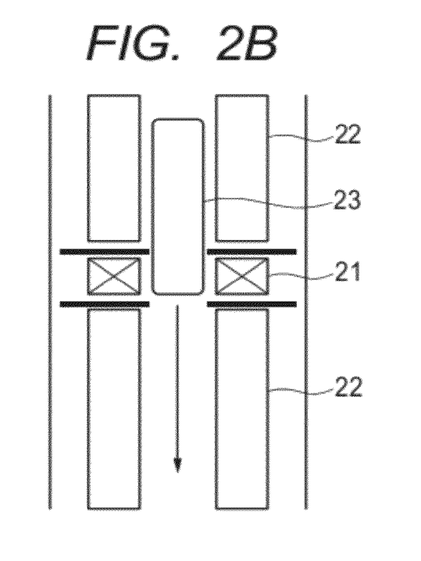
FIG. 2B is another schematic view of an apparatus for manufacturing a scintillator crystal according to the present invention.

FIGS. 2A and 2B illustrate views of an apparatus for manufacturing a scintillator crystal having a phase-separated structure according to the present invention. This apparatus employs the Bridgman method and the sample that contains the materials sealing in a cylindrical container such as a quartz tube so as not to allow the materials to be oxidized is arranged vertically in the apparatus. Then, a scintillator crystal according to the present invention can be manufactured since the position of the solidification interface of the sample can be controlled by moving the heater and/or the sample vertically in a constant direction at a constant speed.

As an example, FIGS. 2A and 2B illustrate an apparatus designed to move the sample 23 vertically downward in a constant direction. As illustrated in FIG. 2A, the apparatus includes a heater section 21 that corresponds to the length in vertical direction of the sample 23 and a water cooling section 22 arranged below the heater section 21 to realize a temperature gradient of 30° C./mm for the solid/liquid interface. Alternatively, as illustrated in FIG. 2B, the water cooling section 22 may include an upper water cooling section and a lower water cooling section and the heater section 21 is arranged between the upper and lower cooling sections so that the heater section 21 corresponds only to a part of the length in vertical direction of the sample 23. A scintillator crystal according to the present invention can also be manufactured by some other equivalent method.

A scintillator crystal according to the present invention can also be manufactured by means of a method of pulling up a crystal out of a melt such as the Czochralski method. Since this method does not involve solidification of the melt of the materials in a container unlike the Bridgman method, this method may be more preferable from the viewpoint that a solid/liquid interface of the materials can be formed without being affected by the wall surface of the container. The floating zone method can also be used to manufacture a scintillator crystal according to the present invention.

Particularly with the Bridgman method, the solidification rate needs to be so adjusted as to make the solid/liquid interface of the sample as planar as possible along a vertical plane that is perpendicular to the moving direction of the heater and/or the sample. However, the heat exchange between the sample being solidified and the outside is realized mainly along the lateral surface of the sample. Therefore, the solidification rate depends on the diameter of the sample. In other words, the heat exchange takes time when the diameter of the sample is large. Then, the solid/liquid interface becomes curved to a large extent unless the solidification rate is reduced and then columnar crystals that are the first crystal phases are formed nonlinearly along a direction in most of the region of the sample. This is because the growing direction of columnar crystals is substantially perpendicular to the solid/liquid interface. Furthermore, when the solidification rate is greater relative to the size of the sample, the solid/liquid interface can be held neither smooth nor planar. Then, as a result, microscopic undulations arise along the moving direction of the heater and/or the sample to give rise to a situation where dendrite crystals are produced but such a situation needs to be avoided. Therefore, a satisfactory temperature gradient of the solid/liquid interface needs to be adjusted and, at the same time, the solidification rate is preferably not greater than 850 mm/h, more preferably not greater than 500 mm/h, most preferably not greater than 300 mm/h.

The diameter of the first crystal phases 11 of the scintillator crystal and the average of the periods of the nearest-neighbor distances of the first crystal phases are dependent on the solidification rate. Particularly, the period of the nearest-neighbor distance is believed to represent a correlation expressed by the formula represented below. Namely, if the period is A and the solidification rate is v, $\lambda^2 \cdot v = $constant. Therefore, when a desired period is selected, the solidification rate is necessarily defined to a limited value. However, the range of the average of the period λ is not less than 500 nm and not more than 50 μm when a solidification rate that makes the solid/liquid interface planar and smooth is taken into consideration as a limitation to the manufacturing method as pointed out above. Then, correspondingly, the range of the diameter of the first crystal phases is not less than 50 nm and not more than 30 μm. The diameter of the first crystal phases also refers to instances where the cross section of the first crystal phases is not circular. For example, if the first crystal phases represent an indeterminate form, the shortest distances across the respective cross sections of the first crystal phases need to be found within the above range. The average ratio of the largest diameter and the shortest diameter of the first crystal phases that are of a large number is preferably not greater than 10. When the average ratio is greater than 10, a lamella structure may appropriately be selected for them. However, even if some of the ratios of the diameters of the plurality of first crystal phases are greater than 10, they are permissible so long as the average ratio is not greater than 10. Additionally, since a lamella structure can be formed more easily when the composition ratio of the materials of the two phases is closer to 1:1 in terms of mol ratio from the viewpoint of manufacturing conditions, the manufacturing conditions and the material(s) to be added are preferably selected so as not to form a lamella structure.

Now, the starting composition of the source materials will be described below. Table 1 represented the composition ratios of the above-described scintillator crystal but the starting composition may be out of the range of the eutectic composition±5 mol %. More specifically, with the Bridgman method, when the entire sample is solidified from a molten state in a direction, the substance that is in excess of the eutectic composition is earlier precipitated in the initial stage of solidification and therefore, as a result, the remaining melt represents the eutectic composition. With the Czochralski method, the substance that is in excess of the eutectic composition is pulled up in the initial stages of the pulling up operation so that preferably a dummy pulling up operation is conducted once and a proper pulling up operation is conducted after the melt comes to represent the eutectic composition. Any unnecessary parts may be separated after manufacturing the scintillator crystal.

Applications of Scintillator Crystal

A scintillator crystal having a phase-separated structure according to the present invention can find applications in the field of radiation detectors for medical, industrial, high energy physical, and aerospace in combination with photodetectors. Particularly, a scintillator crystal according to the present invention has a light guiding function without any partitions and hence may suitably be used in a situation where light needs to be guided in a specific direction toward photodetectors. Further, a scintillator crystal according to the present invention can effectively be used in an X-ray CT scanner that requires partitions or as an alternative for the CsI needle crystal of an X-ray flat panel detector (FPD). In the cases, in order to adjust to the characteristic of light sensitivity of photodetectors, the wavelength of light that is emitted from a scintillator crystal can be adjusted by adding one or more materials and/or adding a luminescent center substance to the light emitting phase.

A scintillator crystal is arranged in such a way that the first crystal phases with unidirectionality are perpendicularly directed to the photodetectors. Preferably, a film or a layer that operates as protection or antireflection is arranged between photodetectors and a scintillator crystal according to the present invention, and the photodetectors and the scintillator crystal are bonded to each other or arranged via such a film or a layer.

EXAMPLE 1

Figure 3A:
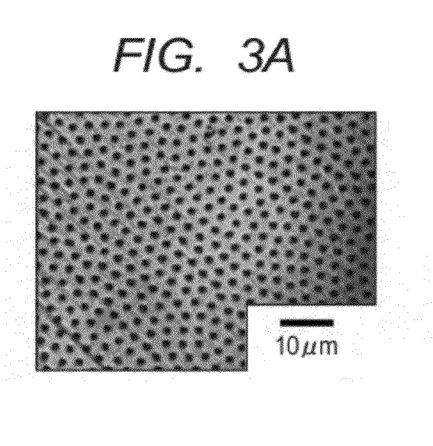
FIG. 3A is an image of a cross section of a scintillator crystal according to the present invention as observed through an optical microscope.
Figure 3B:
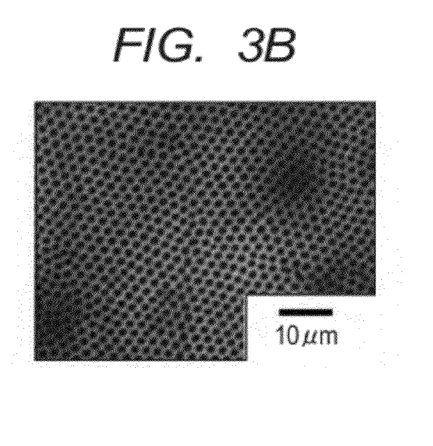
FIG. 3B is another image of a cross section of a scintillator crystal according to the present invention as observed through an optical microscope.
Figure 3C:
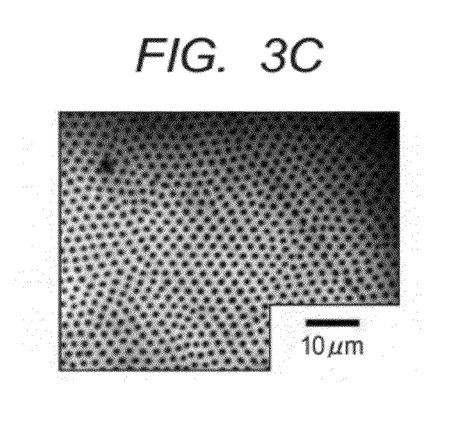
FIG. 3C is still another image of a cross section of a scintillator crystal according to the present invention as observed through an optical microscope.
Figure 3D:
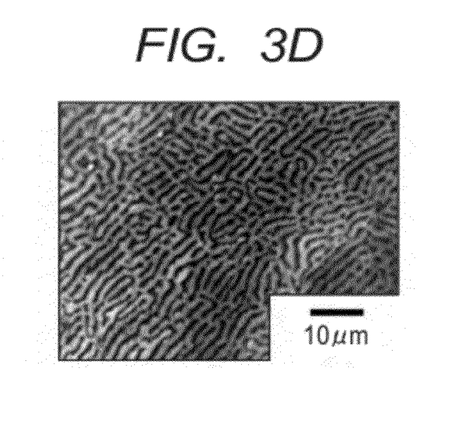
FIG. 3D is still another image of a cross section of a scintillator crystal according to the present invention as observed through an optical microscope.

The present example relates to manufacturing a scintillator crystal having a phase-separated structure. Each mixed powder was prepared by adding NaCl, NaBr, KCl and KBr to CuI so as to be each composition ratio of 10 mol %, 8 mol %, 30 mol % and 25 mol % as represented in Table 1 and then each prepared powder was sealed in quartz tube to obtain a sample. Then, each of the samples was set in the Bridgman furnace having the configuration as illustrated in FIG. 2A and the temperature thereof was raised to 800° C. to melt the material. The melted material was held in melt state for 30 minutes and then pulled down so as to solidify gradually from the bottom part of the material (unidirectional solidification). The material was pulled down and then entered into the region of the water-cooling section where cooling water was circulated in the furnace so as to make the temperature difference between the melted part of the material and the part entered into the region of the water-cooling section not less than 30° C./mm. The four scintillator crystals manufactured in this way were cut and the cut surfaces that were perpendicular to the direction of pulling down the samples and hence to the direction of solidification were observed through an optical microscope. As a result, the CuI—NaCl system showed an excellent phase-separated structure as illustrated in FIG. 3A. The CuI-KCl system, the CuI—NaBr system and the CuI-KBr system also showed an excellent phase-separated structure as illustrated in FIGS. 3B, 3C and 3D respectively. When the crystals were observed through a scanning electron microscope (SEM), long columnar crystals extending in parallel with the direction of solidification were confirmed. The composition analysis units attached to the SEM proved that the columnar crystals of the scintillator crystals consisted of NaCl, KCl, NaBr and KBr respectively and the parts surrounding the columnar crystals consisted of CuI. Thus, this example proved that a structure in which a large number of columnar crystals were extended unidirectionally and surrounded by CuI can be formed. FIGS. 3A to 3D, which are optical microscope images formed by transmitted light, showed light CuI regions that were high refractive index mediums to prove that light was guided within the CuI regions.

Of the four crystals, the volume ratio of the columnar crystal part relative to the CuI part was about 8% in the CuI—NaCl system, about 32% in the CuI-KCl system, about 7% in the CuI—NaBr system, and about 30% in the CuI-KBr system. Note that each of the volume ratios was determined by analyzing the SEM image of the surface obtained by cutting the scintillator crystal in a direction perpendicular to the direction of the growth of the columnar crystals. Thus, different volume ratios were obtained for the different material systems that were used. The CuI-KCl system that showed a high volume ratio is advantageous from the viewpoint of guiding light. Note, however, the effect of volume ratio is adverse to the absorption of radiation into the scintillator crystal when irradiated with radiation such as X-rays. Therefore, an appropriate material system can be selected depending on the application of the scintillator crystal.

Figure 4:
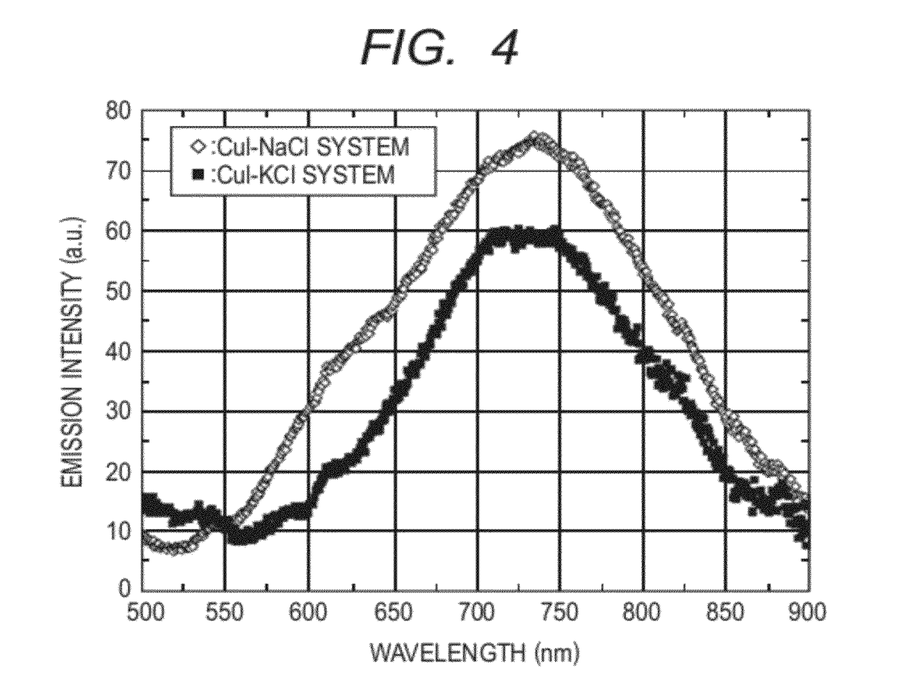
FIG. 4 is an emission spectrum of a scintillator crystal according to the present invention that emits light when excited by X-rays.

FIG. 4 illustrates the results of measuring the emission spectra of the scintillator crystals of the CuI—NaCl system and the CuI-KCl system obtained when the scintillator crystals were excited by X-rays to emit light. The two scintillator crystals were selected from the above manufactured scintillator crystals. X-rays irradiated each of the scintillator crystals parallel to the direction of solidification of the scintillator crystal. Note that the intensity of emitted light is not absolute because the intensity depends on the shape of scintillator crystal and other factors. Both the emission spectrum of the CuI—NaCl system and that of the CuI-KCl system showed a peak at the wavelength of about 730 nm to prove that both of the systems can operate as scintillator.

The above-described results proved that a scintillator crystal according to the present invention has a phase-separated structure when CuI is employed for the second crystal phase.

EXAMPLE 2

Radiation detectors were formed in this example by using the scintillator crystals manufactured in Example 1.

Figure 5:
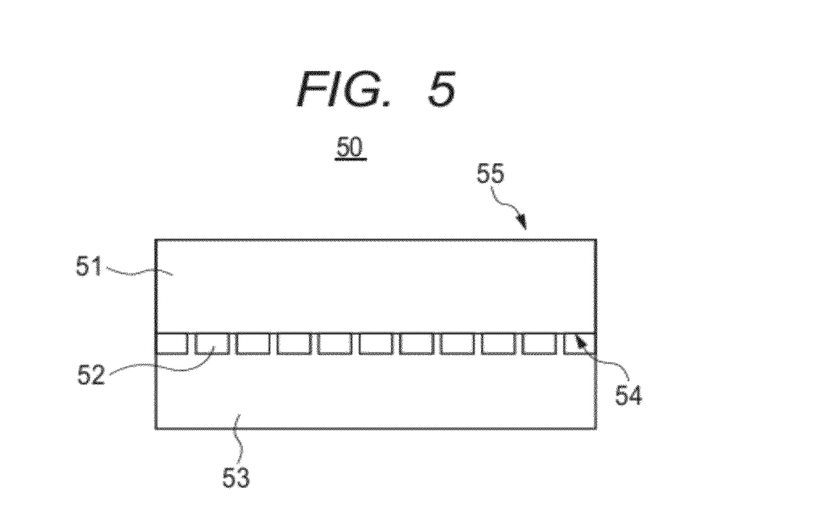
FIG. 5 is a schematic cross-sectional view of a radiation detector according to the present invention.

FIG. 5 is a schematic cross-sectional view of a radiation detector according to the present invention. In this example, the CuI—NaCl system and the CuI-KCl system were selected and the each scintillator crystal was cut to represent a thickness of 1 mm. Then, each of the cut scintillator crystals 51 was arranged on photodetectors 52 arranged in array on a substrate 53 in such a way that the columnar crystals were substantially perpendicularly directed to the photodetectors 52 to form a radiation detector 50. The scintillator crystal 51 had a first principal plane 54 and a second principal plane 55 that were not located on a same plane. The second crystal phase 12 of the scintillator crystal 51 had parts exposed to the first principal plane 54 and to the second principal plane 55. Each of the exposed parts was continuously disposed. In other words, the scintillator crystal 51 was arranged in such a way that the first principal plane 54 faced the photodetectors 52. When the scintillator crystal disposed in the radiation detector was irradiated with X-rays, the output of the photodetector array proved that the spreading of light was suppressed in comparison with a scintillator made of single crystal having no partitions. Note that X-rays irradiated the scintillator crystal parallel to the direction of solidification of the scintillator crystal. When resin was arranged as protective layer between the scintillator crystal having a phase-separated structure and the photodetector array so as to bond thereto, the state of suppressing the spread of light was also confirmed. Thus, the obtained result proved that a radiation detector can be formed when a layer or a film of some foreign material is arranged between a scintillator crystal according to the present invention and a photodetector array.

Figure 6A:
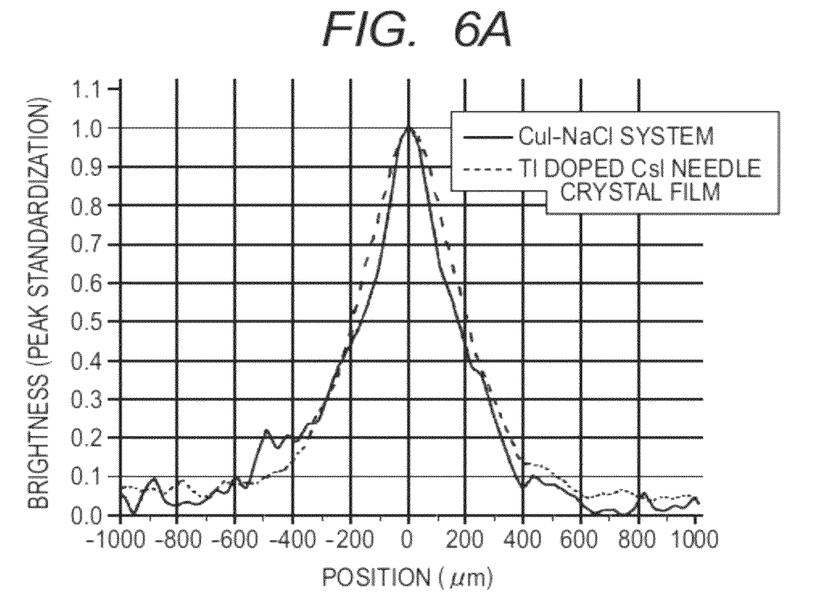
FIG. 6A is a graph illustrating the light guiding function of a scintillator crystal according to the present invention.
Figure 6B:
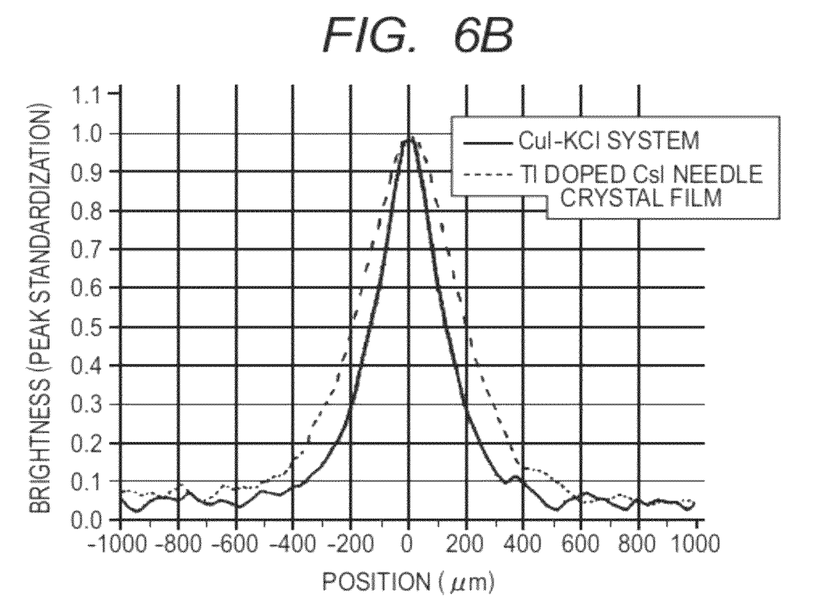
FIG. 6B is another graph illustrating the light guiding function of a scintillator crystal according to the present invention.

For the light guiding functions of the scintillator crystal of the CuI—NaCl system and the CuI-KCl system, the propagation characteristics of emitted light was evaluated, in comparison with a film of Tl-doped CsI needle crystal that is generally believed to have a light guiding function. Both the scintillator crystal of the CuI—NaCl system and the scintillator crystal of the CuI-KCl system had a thickness of 1 mm as described above, and the film of CsI needle crystal sample as a comparative example had a thickness of 430 μm. A tungsten vacuum tube was employed as X-ray source. X-rays obtained under the conditions of 60 kV, 1 mA and no Al filter was irradiated on each of the objects to be measured through an aperture having a diameter of 100 μm of a 2 mm-thick tungsten plate to observe the light intensity distribution at the bottom surface of the object to be measured. X-rays irradiated each of the scintillator crystals parallel to the direction of solidification of the scintillator crystals. CCDs arranged at a pitch of 50 μm were used to observe emitted light. FIGS. 6A and 6B illustrate the light intensity profiles of the cross section, which contain the respective peak values of the light intensity distributions of the samples. FIG. 6A illustrates the profile of the CuI—NaCl system and FIG. 6B illustrates the profile of the CuI-KCl system. Each of the profiles was standardized by peak brightness and the half width thereof was determined. The half width of the CuI-KCl system was 270 μm and that of the CuI—NaCl system was 340 μm, whereas that of the CsI needle crystal film that was thin relative to the thickness of the manufactured scintillator crystals was 400 μm. These data proved that the scintillator crystal of the CuI-KCl system and the CuI—NaCl system according to the present invention had an excellent phase-separated structure and effectively guided light to the respective light receiving surfaces with little scattering of light when guiding light.

Thus, this example proved that a scintillator crystal having a phase-separated structure and a second crystal phase made of CuI has a light guiding function and can effectively be employed for a radiation detector according to the present invention.

Industrial Applicability

A scintillator crystal having a phase-separated structure according to the present invention emits light when excited by radiation and has a function of guiding the emitted light so that the scintillator crystal can effectively be employed to form a radiation detector without partitions when combined with photodetectors. Particularly, a scintillator crystal according to the present invention can find applications in the field of measurement instruments utilizing radiation, such as X-rays, for medical, industrial, high energy physical, and aerospace.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-074978, filed Mar. 30, 2011, which is hereby incorporated by reference herein in its entirety.

What is claimed is:

1. A scintillator crystal, comprising:
a plurality of first crystal phases with unidirectionality; and
a second crystal phase covering lateral surfaces of the first crystal phases, wherein
the second crystal phase comprises CuI.

2. The scintillator crystal according to claim 1, wherein the first crystal phases comprise columnar crystals.

3. The scintillator crystal according to claim 1, wherein the second crystal phase has a refractive index greater than a refractive index of the first crystal phases.

4. The scintillator crystal according to claim 1, wherein the first crystal phases comprise NaCl, NaBr, KCl or KBr.

5. The scintillator crystal according to claim 1, wherein, when a composition ratio of the first crystal phases is X (mol %) and a composition ratio of the second crystal phase is Y (mol %) in eutectic composition of the first crystal phases and the second crystal phase, a composition ratio X' (mol %) of the first crystal phases and a composition ratio Y' (mol %) of the second crystal phase in the scintillator crystal satisfy the requirements of $(X-5) \leq X' \leq (X+5)$ and $X'+Y'=100$.

6. The scintillator crystal according to claim 1, wherein an average of nearest-neighbor distances of the first crystal phases is not less than 500 nm and not more than 50 μm.

7. The scintillator crystal according to claim 1, wherein the second crystal phase emits light when the second crystal phase is excited by radiation.

8. A radiation detector comprising a photodetector and a scintillator crystal arranged to face the photodetector, wherein
  the scintillator crystal is a scintillator crystal according to claim 1 and is arranged in such a way that the first crystal phase is perpendicularly directed to the photodetector.

9. The radiation detector according to claim 8, wherein a protective layer is arranged between the photodetector and the scintillator crystal.

* * * * *